United States Patent [19]
Thayer

[11] Patent Number: 5,196,876
[45] Date of Patent: Mar. 23, 1993

[54] PHOTOGRAPHY BOOTH AND METHOD

[76] Inventor: Donald O. Thayer, 153 Lincoln Ave., Garden City, N.Y. 11530

[21] Appl. No.: 791,656

[22] Filed: Nov. 13, 1991

Related U.S. Application Data

[63] Continuation-in-part of Ser. No. 439,642, Nov. 20, 1989, Pat. No. 5,072,246.

[51] Int. Cl.$^5$ .............. G03B 29/00; G03B 13/08; G03B 15/06; H04N 5/225
[52] U.S. Cl. ...................... 354/78; 354/220; 354/290; 358/909
[58] Field of Search ............. 354/75, 76, 78, 220, 354/290; 358/906, 909

[56] References Cited

U.S. PATENT DOCUMENTS

| | | | |
|---|---|---|---|
| 1,794,142 | 3/1931 | Boston | 354/220 |
| 1,799,966 | 9/1931 | Roth | 354/290 |
| 1,926,657 | 9/1933 | Simjian | 354/220 |
| 2,625,857 | 1/1953 | Simjian | 354/220 |
| 2,796,801 | 6/1957 | Simjun | 354/76 |
| 2,958,269 | 7/1960 | Simjian | 354/76 |
| 3,341,026 | 9/1967 | Seitler | 312/321.5 |
| 3,398,664 | 8/1968 | Bonatsos | 354/81 |
| 3,653,314 | 5/1972 | Swann | 95/44 A |
| 3,812,506 | 12/1974 | Klebanow | 354/80 |
| 3,864,708 | 0/1975 | Allen | 354/290 |
| 4,072,973 | 2/1978 | Mayo | 354/295 |
| 4,089,017 | 5/1978 | Buldini | 354/81 |
| 4,618,239 | 3/1986 | Sakamoto | 354/477 |
| 4,738,526 | 4/1988 | Larish | 354/412 |
| 4,804,983 | 3/1989 | Thayer, Jr. | 354/76 |
| 4,805,037 | 7/1989 | Noble et al. | 358/335 |
| 4,835,563 | 1/1989 | Larish | 354/412 |
| 4,888,605 | 12/1989 | Matsumoto | 354/75 |
| 5,072,246 | 12/1991 | Thayer et al. | 354/78 |

FOREIGN PATENT DOCUMENTS 3018722  4/1981  Fed. Rep. of Germany .

Primary Examiner—Michael L. Gellner
Assistant Examiner—Jae N. Noh
Attorney, Agent, or Firm—Joseph W. Berenato, III

[57] ABSTRACT

A photography system includes a photograph producing first system having a camera with a photographically usable output, an electronic output corresponding to the photographically usable output, a first video display and a photograph producing system for receiving the photographically usable output and for generating a photograph therefrom. A second system includes a camera having an electronic output, and a second video display. A control system is operably associated with said first and second systems for causing the electronic output of the first system to be displayed by the second video display, for causing the electronic output of the second system to be selectively displayed by said first video display, and for controlling operation of the photograph producing system.

21 Claims, 3 Drawing Sheets

PHOTOGRAPHY BOOTH AND METHOD

RELATED APPLICATIONS

This is a continuation-in-part of application Ser. No. 439,642, filed Nov. 20, 1989, by Donald O. Thayer and Michael D. Thayer for Self Photography Booth and Method, the disclosure of which is incorporated herein by reference now U.S. Pat. No. 5,072,246.

BACKGROUND OF THE INVENTION

My above-referenced pending application discloses a photography booth and method permitting an individual to view the image being perceived by a film camera so that the film camera may be operated by the individual when a desired pose is presented. That photography booth utilizes a unique optical system, comprising both a film and a video camera, for causing the individual to look into the lenses of both cameras, because a semitransparent mirror reflects the perceived image generated by a video display connected to the video camera into alignment with the camera lens. Because the perceived image, as reflected by the mirror, is superposed with the viewing field of the lens of the film camera, then I make certain that the individual to be photographed is looking into the camera lens. That photography booth is primarily intended for self photography; namely, permitting the individual who is to be photographed to select the desired pose.

One disadvantage of the photography booth disclosed in my co-pending application is the requirement that the individual who is to be photographed operate the camera. Such a system is not practical for small children, because they may find it difficult to operate the system while also striking a pose. Because it is only the child's photograph which is desired, then it is not feasible to have someone else in the viewing area for operating the camera.

The disclosed invention is directed to a photography booth and method which is uniquely designed to permit a child to be photographed, while still realizing the benefits of the optical system of my prior referenced application. In the present invention, I utilize a second, remotely located video display from which the child's image is projected in order to permit the mother, father, or like user to view the image perceived by the camera so that the camera may be operated when a desired pose is achieved. Also, the image displayed to the child may be that of the mother or father as taken by a second video camera, its own image as perceived by the camera, or any one of a number of pre-selected images stored in an accessible storage system. The pre-selected images may include cartoon characters, particular scenes, or the like, and means are provided for permitting these pre-selected images to be changed over time, in order to make certain that the child's attention is not distracted or the child become bored.

SUMMARY OF THE PRESENT INVENTION

The primary object of the disclosed invention is to provide a photography system which utilizes a displayed image in order to cause the subject to look into the lens of a camera, while displaying on a remote display the image perceived by the camera.

Yet a further object of the disclosed invention is a method for taking photographs whereby the image perceived by the camera is displayed on a first monitor which is remote from the subject, while an image is displayed to the subject in order to cause the subject to look into the lens of the camera.

A photography system according to the invention includes a photograph producing first system comprising camera means having a photographically usable output, an electronic output corresponding to the photographically usable output, a first video display, and a photograph producing means for receiving the photographically usable output and generating a photograph therefrom. A second system comprises camera means having an electronic output, and a second video display. Control means are operably associated with the systems for causing the electronic output of the first system to be displayed by the second video display, for permitting the electronic output of the second system to be selectively displayed by the first video display, and for controlling operation of the photograph producing means.

A photography booth includes an enclosure having angularly disposed first and second walls, with the first wall having an opening therein. A first camera is disposed within the enclosure and has an image inlet oriented in a first direction aligned with the opening. A first display is disposed within the enclosure and has a display outlet aligned with the opening. Photograph producing means are operably associated with the first camera for generating a photograph of an image perceived through the image inlet by the first camera. A second camera is operably associated with the second wall, the second camera has an image inlet oriented in a second direction disposed exteriorly relative to the enclosure. A second display is operably associated with the second camera, and has a display outlet generally aligned in the second direction. Control means are operably associated with the first and second cameras and with the first and second displays for causing the image perceived by the first camera to be displayed by the second display, and for selectively causing a photograph to be generated by the photograph producing means when a desired image is displayed by the second display.

A method of taking photographs includes the steps of displaying the image of a subject perceived by a camera on a first display remote from the subject. An image is displayed to the subject on a second display, the image as displayed by the second display being aligned with the camera for causing the subject to look toward the camera. The camera is operated, and a photograph generated, when a desired image of the subject is displayed on the first display.

These and other objects and advantages of the invention will be readily apparent in view of the following description and drawings of the above-described invention.

DESCRIPTION OF THE DRAWINGS

The above and other objects and advantages and novel features of the present invention will become apparent from the following detailed description of the preferred embodiment of the invention illustrated in the accompanying drawings, wherein.

DETAILED DESCRIPTION OF THE PRESENT INVENTION

Figure 1:
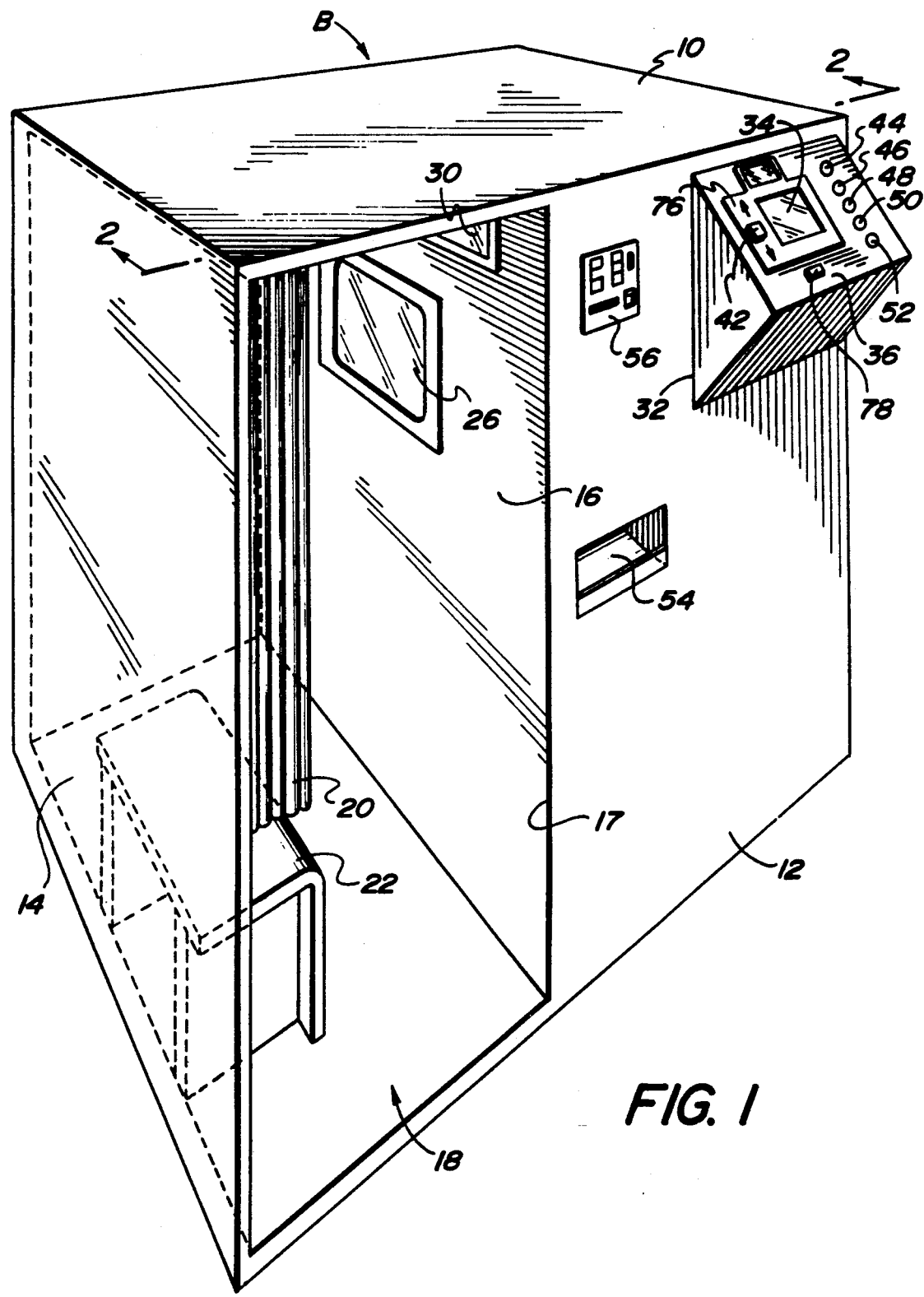
FIG. 1 is a perspective view of a photography booth according to the invention.

Photography booth B, as best shown in FIG. 1, includes an enclosure having a top 10, side wall 12, rear wall 14 and front wall 16. Side wall 12 has an opening 17 therein to permit access by a subject to the interior 18 of booth B, and opening 17 may be closed by movable curtain 20. A bench 22 is positioned within the interior 18, and permits the subject to sit or stand.

Figure 2:
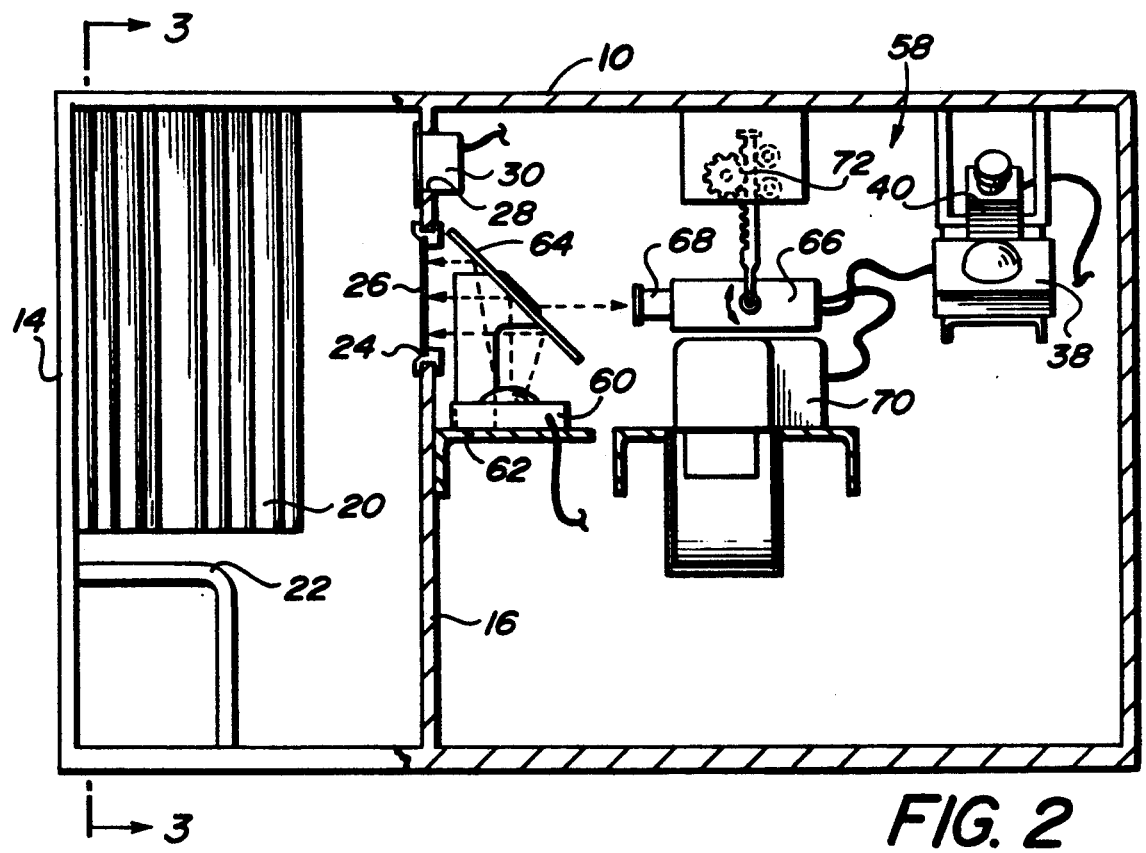
FIG. 2 is a cross-sectional view taken along the line 2—2 of FIG. 1 and viewed in the direction of the arrows.

As best shown in FIGS. 1 and 2, front wall 16 has an opening 24 therein closed by transparent pane 26. A further opening 28 is disposed above the opening 24, and lighting system 30 is positioned therein to provide illumination within the interior 18, particularly when a photograph is being taken. I prefer that the lighting system 30 always have some lamps illuminated, so that the interior 18 appears ready for operation. I also prefer that the lighting system 30 contain flash illuminators for use when a photograph is being taken, particularly if the photograph is to be taken by a film camera.

Figure 3:
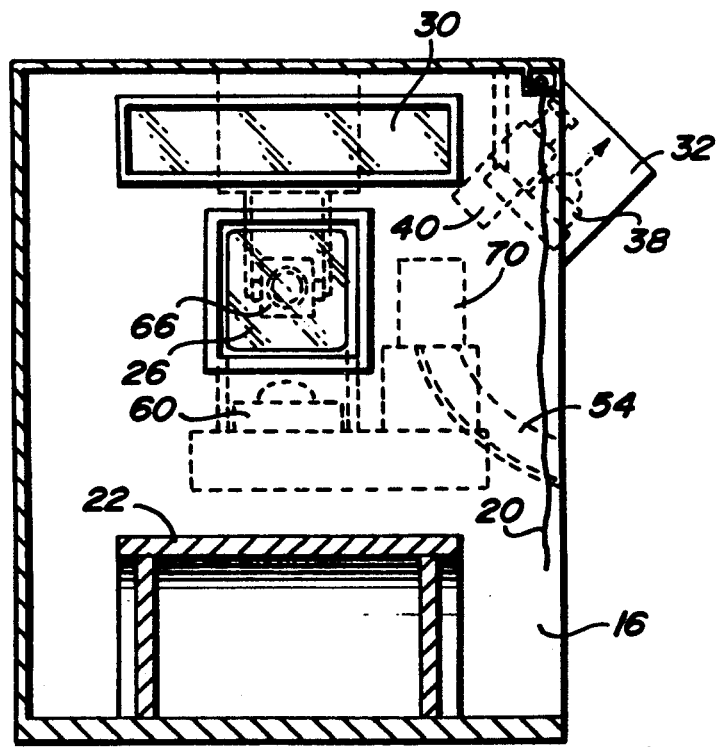
FIG. 3 is a cross-sectional view taken along the line 3—3 of FIG. 2 and viewed in the direction of the arrows.

As best shown in FIGS. 1 and 3, control station 32 is disposed exteriorly of side wall 12. Control station 32 includes a transparent pane 34 on the sloping upper surface 36 thereof. Pane 36 is aligned with display 38 and electronic camera 40, for reasons explained later, and camera 40 and display 38 are aligned in the same general direction. Also illustrated on upper surface 36 of control station 32 is slide button 42, and control buttons 44, 46, 48, 50, and 52.

FIGS. 1 and 3 also illustrate chute 54 from which a photograph, when taken, is dispensed. The chute 54 opens on side wall 12 adjacent control station 32 so that the person operating the booth B through control station 32 will receive the ultimately generated photograph. Also illustrated in FIG. 1 is the payment system 56, which may accept currency and/or charge cards.

Booth B also has enclosed space 58, as best shown in FIG. 2, within which the operating components of the photography system are disposed. I prefer that the operating components be positioned within the enclosed space 58 in order to minimize vandalism. The components disposed within the space 58 are, preferably, commercially available in order to permit them to be readily exchanged in the event of component failure. The enclosed space 58 should, preferably, have a door in order to permit access to the components within the enclosed space 58 in the event repair is necessary. The ability to conduct routine maintenance and supply replacement is required.

Display 60 is mounted on support 62 attached to wall 16 below opening 24. The display 60 is a video display or monitor, and upwardly projects an image as indicated by the dotted lines of FIG. 2. Semitransparent pane 64 is mounted above display 60. Pane 64 is angularly disposed relative to support 62, and preferably is oriented at 45° to the horizontal, in order to cause the image generated by display 60 to be reflected thereby through pane 26 into interior 18. I prefer that the pane 64 have both light reflective and transmissive properties, preferably of equal ratio. Because of pane 64 and its orientation relative to the opening 24 and the display 60, the subject sitting on the bench 22 may view the image generated by the display 60, and thereby be instinctively drawn to the reflected image.

Camera 66 is mounted behind pane 64, and has a lens or image inlet 68 aligned with the opening 24 for viewing images oriented in a first direction defined by lens 68. Because of the light transmissive properties of the pane 64, the camera 66 looks through the pane 64 and therefore perceives the image of the subject on the bench 22. I prefer that the camera 66 be an electronic camera of the video type, which therefore generates an electronic output usable by the display 38 and printer 70. Camera 66 has a photographically usable output and an electronic output, although these outputs need not be separate. It is merely necessary that the camera 66 output be split or otherwise manipulated in order to serve its diverse purposes.

My earlier referenced application discloses an optical system employing an electronic camera and a film camera, but I prefer in this invention that there be a single electronic camera 66. Electronic cameras are marketed by both Eastman Kodak and Canon, and the resulting picture quality issuing from an electronic printer, such as printer 70, is quite good. Also, because the output of camera 66 is an electrical signal, I may manipulate that signal in order to freeze the image, alter the image, or otherwise make use of modern electronic technology to create the photograph desired. Although I prefer a single camera 66, those skilled in the art will appreciate that the invention may be practiced through the use of both a film and a video camera as reflected in my earlier referenced application. The use of a single camera minimizes space requirements, thereby permitting a compact booth to be constructed.

Rack and pinion gear system 72 is mounted to top 10, and has a shaft 74 pivotally connected to camera 66. Operation of the rack and pinion system 72 is used to pivot the camera 66, in order to take into account subjects of varying height. There is no need to pivot the display 60, because it will display whatever image is received, and thereby take into account pivoting movement of the camera 66.

As earlier noted, control station 32 includes a display 38 and a camera 40. The display 38 is a conventional video display, much the same as the display 60. Display 38 is connected to the camera 66 by suitable wiring in order to receive the output from camera 66 and permit the image perceived by the lens 68 to be transmitted onto the pane 34. In this way, the operator of the booth B views the exact image being perceived by the camera 66, and therefore may select whatever pose is desired.

The camera 40, positioned within control station 32, is also preferably of an electronic format. The camera 40 looks outwardly through the pane 34, and captures the image of the operator of the booth B. The electronic output of the camera 40 may be fed to the display 60. In this way, should a small child be seated within interior 18, then the image which it views through the pane 26 will be that of its mother, father or other such person, and an image to which it will instinctively be drawn. This minimizes the possibility of the child becoming scared or uncomfortable while in interior 18, particularly because the operator may give the child verbal instructions at the same time as the image is being seen because curtain 20 blocks light but not sound. The output of display 60 is superposed with the viewing field of camera 66 so that the child is thereby caused to look into the lens 68. Because a single camera is used, then the image displayed by display 38 is exactly the same as that which will be generated as a photograph.

Control station 32 has slide button 42 for controlling operation of the rack and pinion system 72. The oppositely oriented arrows on camera 66 provide an indication of the direction of movement which occurs. Because the image perceived by the lens 68 is displayed by display 38 on pane 34, then the slide button 42 permits the user to properly align the camera 66 to take into account the height of the subject to be photographed. Thus, the child will not be distracted by having the user come within interior 18 in order to check the pose and/or orientation relative to camera 66.

Figure 5:
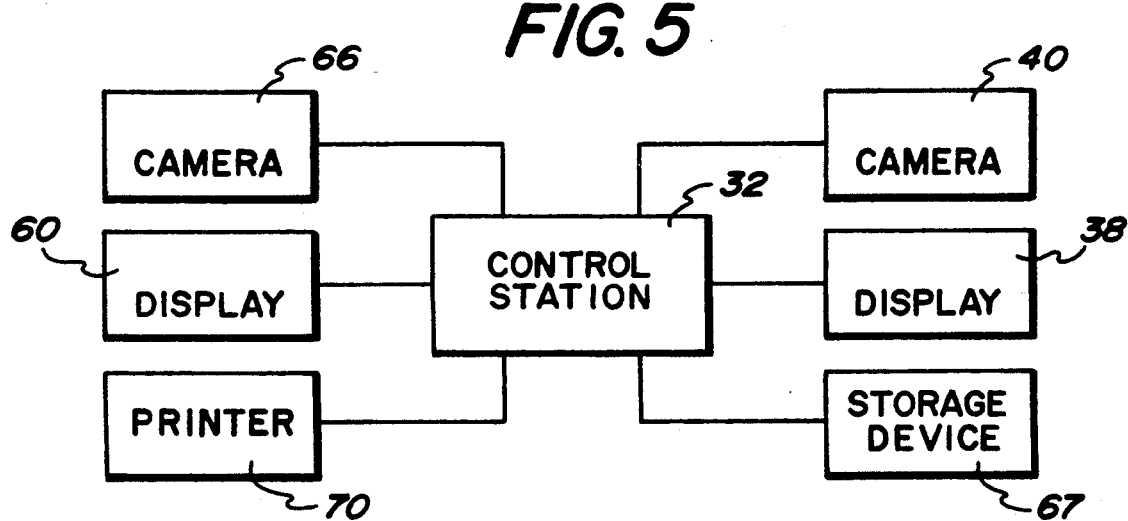
FIG. 5 is a schematic diagram illustrating the interconnection of the components with the controller.

The push button 44 is operably connected with camera 40 through a control system, such as schematically shown in FIG. 5, and causes the image perceived by camera 40 to be displayed to the subject by virtue of the mirror 64. The push buttons 46, 48, 50 and 52, on the other hand, preferably are each associated with some preselected image which is stored in memory, as schematically illustrated in FIG. 5. The storage system 67 may be a computer memory or a CD-ROM or the like permitting images to be stored, randomly accessed, and displayed. The user, by pressing one of those push buttons, can cause the image displayed by display 60 to be any one of those pre-selected images, and also cause the displayed image to be changed in order to overcome boredom, distraction and the like. I prefer that the preselected images be cartoon characters, well-known scenes, and the like, all of which will cause the child's attention to be attracted, thereby causing the child to look into the lens 68 because of the alignment of the output image of display 60 with the viewing axis of camera 66 as defined by lens 68.

Use of the booth B of FIGS. 1-3 is quite easy, and relatively straightforward. The subject to be photographed is placed upon the bench 22, and the curtain 20 closed in order to minimize the impact of exterior illumination. The appropriate payment is input through payment system 56, thereby making the booth B and the control station 32 operable.

Once the control station 32 is operable, then the user stands by the control station 32 and views the image perceived by the lens 68 by virtue of the display 38. At the same time, the user may press any one of the push buttons 44, 46, 48, 50, and 52 in order to transmit the desired image to the subject by virtue of the display 60 and the mirror 64, may allow his or her image as captured by camera 40 to be displayed, or may allow the image perceived by camera 66 to be displayed on display 60. Appropriate adjustment of the camera 66 is achieved by manipulation of the slide button 42, until the proper orientation is achieved. Once the proper orientation is achieved, then it is merely a question of monitoring the subject until the proper pose is presented.

Once the proper pose has been achieved, then push button 78 is pressed, thereby causing the image captured at that moment in time by the camera 66 to be outputted to the printer 70 for the generation of a hard copy or photograph. While I prefer that operation of the push button 78 cause the generation of a photograph, those skilled in the art will understand that operation of the push button 78 may cause the frame or picture to be frozen, in order to permit more careful viewing thereof while that image is continuously displayed. Yet a further push button or push buttons may then be operated, to either cause that captured, frozen image to be printed or to again begin the process of viewing the subject. In either event, the booth B permits the user to stand outside the booth, while the child to be photographed is positioned within the interior 18 on the bench 22.

Figure 4:
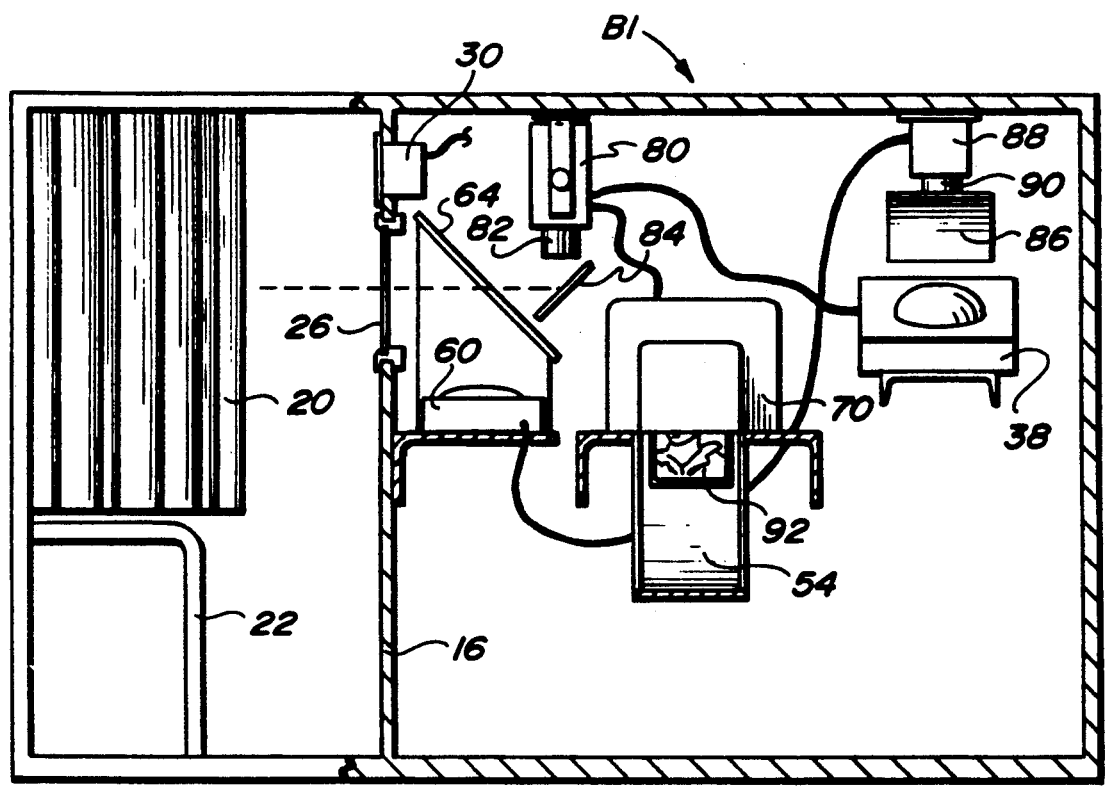
FIG. 4 is a cross-sectional view of a second embodiment of the invention.

Booth B1, as best shown in FIG. 4, is similar to the booth B of FIGS. 1-3, and utilizes the same optical system. Like parts will therefore hereinafter have the same numbers.

Electronic camera 80 has a lens 82 aligned with secondary mirror 84. The mirror 84 is disposed essentially perpendicular to the plane on which the mirror 64 lies, with the result that the image of the subject as reflected by the mirror 84 is projected vertically upwardly. Unlike the mirror 64, the mirror 84 is essentially reflective in its optical properties. The mirror 84 reverses the image reflected by the mirror 64, because, as is known to those skilled in the art, a mirror will naturally reverse an image. The orientation of the mirrors 64 and 84, therefore, assures that the image perceived by the camera 80 is, in fact, the actual image of the subject in its proper orientation. The mirror 84 avoids the need to electronically reverse the image transmitted to the printer 70. Camera 80 is therefore oriented in a first direction disposed oppositely to and in parallel with the direction in which display 60 is oriented.

Beam splitter 86 is positioned within control station 32 above display 38. The beam splitter 86 may be, for example, a semi-transparent mirror of the form of mirror 64, or some other device of like performance. Video camera 88 is positioned above beam splitter 86 and has a lens 90 which receives the image reflected by the beam splitter 86 of the user standing in front of control station 32. The beam splitter 86 is, preferably, at an angle of 45° to the horizontal in order to cause the reflected image to be directed vertically upwardly into the camera 88. The embodiment of FIG. 4 therefore has the cameras 80 and 88 vertically disposed, whereas the embodiment of FIG. 2 has the camera 66 horizontally disposed and the camera 40 angularly disposed.

FIG. 4 also discloses photograph 92 being generated by printer 70, and being received within chute 54. The photograph 92 is an electronically generated hard copy of the output of camera 80, although those skilled in the art will appreciate that the photograph 92 could, instead, have been the hard copy output of, for example, a Polaroid camera or the like.

While this invention has been described as having a preferred design, it is understood that it is capable of further modifications, uses and/or adaptations of the invention, following the general principle of the invention and including such departures from the present disclosure has come within known or customary practice in the art to which the invention pertains, and as may be applied to the central features hereinbefore set forth, and fall within the scope of the invention of the limits of the appended claims.

I claim:

1. A photography system, comprising:
   a) a photograph producing first system comprising camera means having a photographically usable output, an electronic output corresponding to the photographically usable output, a first video display, and a photograph producing means for receiving the photographically usable output and generating a photograph therefrom;

b) a second system comprising camera means having an electronic output, and a second video display; and c) control means operably associated with said systems for causing the electronic output of said first system to be displayed by said second video display, for permitting the electronic output of said second system to be selectively displayed by said first video display, and for controlling operation of said photograph producing means.

2. The system of claim 1, wherein:
a) said second system camera means includes means for storing at least a first pre-selected image; and
b) said control means includes means for causing the first pre-selected image to be the electronic output.

3. The system of claim 1, wherein:
a) said photographically usable output is an electronic output.

4. The system of claim 1, wherein:
a) said camera means of said first and second systems are each an electronic camera.

5. The system of claim 4, wherein:
a) said first system camera means photographically usable output and electronic output are common.

6. The system of claim 4, wherein:
a) means are operably associated with said first system electronic camera for adjusting the positioning thereof; and
b) means are operably associated with said control means and with said adjusting means for controlling operation of said adjusting means.

7. The system of claim 1, wherein:
a) said first camera means first system has an image inlet oriented in a first pre-selected direction toward a desired locus; and
b) said first video display is disposed intermediate the locus and said first camera means.

8. The system of claim 7, wherein:
a) said first video display is oriented in a second pre-selected direction angularly disposed relative to said first pre-selected direction.

9. The system of claim 8, wherein:
a) semi-transparent mirror means cooperate with said first video display and with said first system camera means for permitting the display of said first video display to be reflected in said first pre-selected direction toward the locus.

10. The system of claim 9, wherein:
a) said first and second pre-selected directions are perpendicularly disposed; and
b) said mirror means is disposed at an angle of 45° relative to said first pre-selected direction.

11. The system of claim 7, wherein:
a) said first video display is disposed below said first system camera means.

12. The system of claim 4, wherein:
a) said control means includes means for permitting a desired image corresponding to the electronic output of said first system camera means to be continuously displayed.

13. The system of claim 7, wherein:
a) said first and second pre-selected directions are disposed in parallel.

14. The system of claim 13, wherein:
a) said first and second pre-selected directions are oppositely disposed.

15. A photography booth, comprising:
a) an enclosure having angularly disposed first and second walls, and said first wall having an opening therein;
b) a first camera disposed within said enclosure and having an image inlet oriented in a first direction aligned with said opening;
c) a first display system disposed within said enclosure and including means aligned with said opening for directing a generated image therethrough;
d) photograph producing means operably associated with said first camera for generating a photograph of an image perceived through the image inlet;
e) a second camera operably associated with said second wall, said second camera having an image inlet oriented in a second direction disposed exteriorly relative to said enclosure;
f) a second display operably associated with second camera and having a display outlet generally aligned in said second direction; and
g) control means operably associated with said first and second cameras and with said first and second displays for causing the image perceived by said first camera to be displayed by said second display and for selectively causing a photograph to be generated by said photograph producing means upon a desired image being displayed by said second display.

16. The booth of claim 15, wherein:
a) said second camera means includes means for storing at least a first pre-selected image; and
b) said control means includes means for causing the first pre-selected image to be selectively displayed by said first display.

17. The system of claim 15, wherein:
a) each of said first and second cameras is an electronic camera.

18. The system of claim 15, wherein:
a) said display outlet is angularly disposed relative to said first direction; and
b) semi-transparent mirror means are operably associated with said first camera and said first display for causing the image perceived by said image inlet to be reflected in said first direction.

19. The booth of claim 17, wherein:
a) said image inlet and said display outlet are oppositely disposed.

20. A photograph system, comprising:
a) a photograph producing system comprising a camera system having an image inlet and an output usable for creating corresponding photographic and video images, a first video display proximate said camera system, and mirror means aligned with said input and said first display so that the image displayed by the display is perceived on the mirror means in alignment with said input;
b) means communicating the video image to said first display;
c) a second video display remote from said photograph producing system and operably associated with said camera system for simultaneously displaying the video image thereon; and
d) operating means proximate said second video display for selectively causing a photographic image to be produced.

21. A method of taking photographs, comprising the steps of:
a) providing a first camera system comprising a camera assembly having corresponding photographically and electronically usable output, a first video display, and a reflector for causing the output of the first video display to be aligned with the input of the camera assembly;

b) providing a second video display remote from said camera system;

c) simultaneously displaying the electronic output of the camera assembly on the first and second displays; and d) remotely operating the camera assembly and causing a photograph to be created from the photographic output.

* * * * *